May 23, 1944.  H. V. HARDMAN ET AL  2,349,549
METHOD OF MAKING DEPOLYMERIZED RUBBER ARTICLES
Filed April 24, 1941
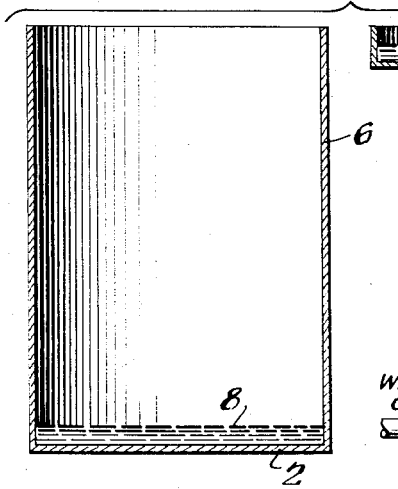
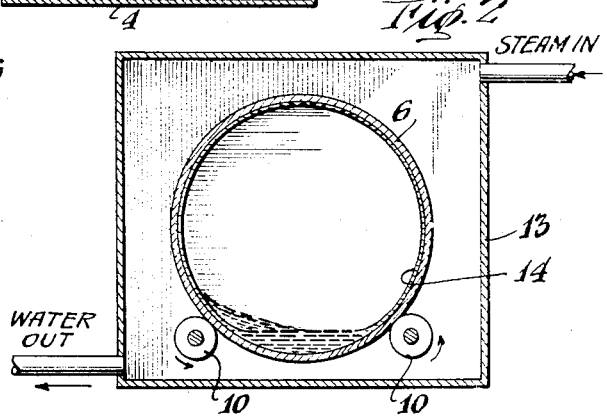
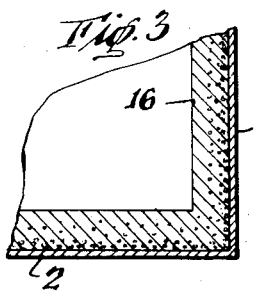
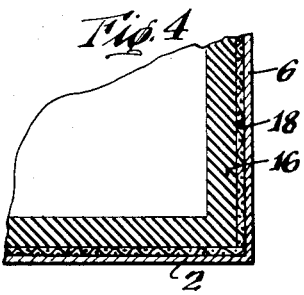
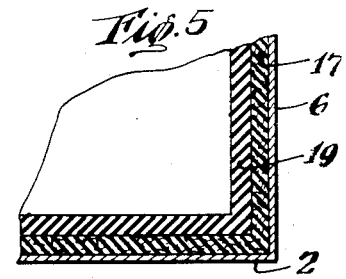
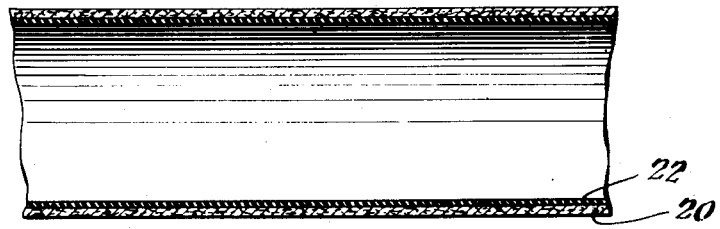
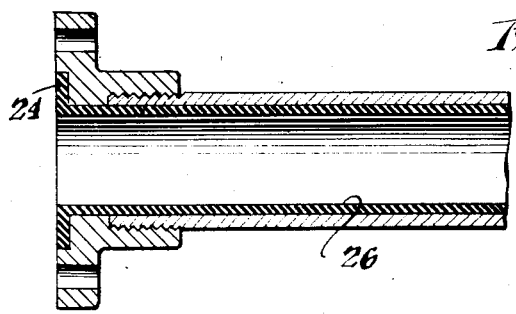
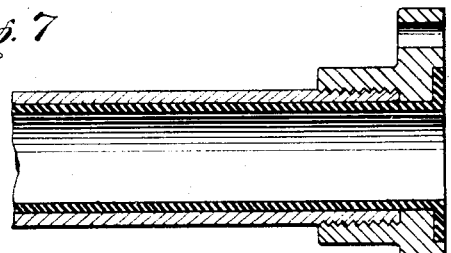
INVENTORS
*Herbert V. Hardman*
*Kenneth V. Hardman*
BY *Alan M. Mann*
ATTORNEY Patented May 23, 1944

2,349,549

UNITED STATES PATENT OFFICE 2,349,549

METHOD OF MAKING DEPOLYMERIZED RUBBER ARTICLES

Herbert V. Hardman, Belleville, and Kenneth V. Hardman, Clifton, N. J.

Application April 24, 1941, Serial No. 390,052

7 Claims. (Cl. 18—58)

This invention relates to the method of making articles of manufacture comprising depolymerized rubber. More particularly, the invention relates to the method of making drums, cans, tanks, pipes and the like, including an integral layer of depolymerized rubber in cast and hardened condition without the need of volatile solvent in the casting.

Because the invention is especially useful in making cast rubber containers, either with or without the mold being left in the final product, the invention will be first illustrated by description in connection with such articles.

At present much difficulty is experienced in making rubber-lined tanks or the like. Ordinarily it is necessary to apply calendered sheets of compounded rubber to the metal that is to be protected and vulcanize the applied sheets by heating finally with hot water or live steam. Seepage of moisture under the sheets when not perfectly joined produces blisters or pimples. Also, the hot water or steam produces irregularities of surface; to avoid this, it is not uncommon to place tinfoil or other protective material over the surfaces of the applied sheets of rubber before vulcanization is undertaken. Regardless of the cost and inconvenience of this process, imperfections in the coated articles frequently require relining or cause failures in use. Furthermore, such use of tinfoil or the like and its subsequent removal is practically impossible when objects of small size or special shapes, such as a 50-gallon drum with an integral head, are being coated.

The present invention provides a simple and convenient method for making a lining of a rubber compound on articles of metal or other material. Since the coating so made is integral and firm, the material upon which the lining is shaped initially may be separated from the liner, to leave an article consisting of the compound only in hardened condition.

The invention comprises the herein described products and method of making them. In the preferred embodiment, the invention comprises the method of and the product resulting from coating the inside surfaces of the several parts or surfaces of a mold suitably in the form of a container, with flowable depolymerized rubber compound adapted to be hardened, partially but incompletely hardening separately the several applications of the compound, if different parts of the container have been coated in succession, and then finally hardening all of the applied compound at the same time, to an integral, hard, shape-retaining, and strong composition. The invention comprises also articles made as described but with the container serving originally as the mold removed finally from the cast and hardened article. In certain embodiments, the invention includes reinforcing material such as a fabric or particles of filler embedded in the wall of the cast article.

The rubber for use in our method and products is first depolymerized in a usual manner as, for example, by heating either crude, vulcanized, or reclaimed rubber to a temperature adapted to cause melting and conversion of the rubber to a form that remains flowable after cooling to ordinary temperatures but that is vulcanizable with sulfur. In the depolymerization, we have used to advantage a temperature of approximately 270° to 300° C. and, preferably, approximately 290° C. for a period of several hours, say about 2 to 4 hours.

The rubber so depolymerized is compounded with conventional rubber compounding ingredients including a vulcanization agent and, suitably, also a filler and a softener.

As a vulcanization agent, the use of sulfur in usual manner introduces a difficulty, since in our preferred method the depolymerized rubber compound is shaped under the influence of centrifugal force. We have now found that the difficulty due to the separation of sulfur, when the compound containing it is being distributed by centrifugal force, is eliminated by the fine grinding of the sulfur into the depolymerized rubber with paint grinding mills or like equipment and keeping the centrifugal force at a minimum until the compound thickens. Fine grinding also prevents gravity settling and prevents gassing during vulcanization.

In addition to the sulfur, there may be used a usual vulcanization accelerator of kind that is conventional in the acceleration of ordinary rubber.

As filler, there is preferably used fine sand, finely ground quartz of fineness to pass largely through a 300-mesh screen, asbestos fibres or fines, or the like. Particles of the filler may be relatively very coarse as compared to the ground sulfur dispersed in the compound.

Special steps are necessary to make depolymerized rubber compositions that, in the finally cured condition, are free from air bubbles. For this reason, our compounds are treated to separate even the finest bubbles of air, as by being kneaded in a partial vacuum and eventually being consolidated or pressed together while vacuum is still applied. Thus, the depolymerized rubber may be mixed with sulfur and the other selected compounding ingredients in a mixer, of the Werner and Pfleiderer type of bread dough type of mixer. Material direct from the mixer, when vulcanized, undergoes an increase in volume due to the expansion of the contained air at the temperature of vulcanization. To overcome this difficulty, the composition from the mixer, in the form of relatively thin layers, is passed between warm pressure rollers that turn towards each other and force the incoming stock under pressure against itself, while the stock is maintained in a partial vacuum produced by conventional means inside a housing surrounding the roller equipment. When so treated, the material shows practically no air bubbles on being reconverted to liquid form at a moderately elevated temperature, shaped, and vulcanized.

Various proportions of the compounding ingredients may be used, the proportions of any ingredient being varied as more or less of its effect in the compound is desired. A typical compound that we have used to advantage is the following:

| Ingredient | Proportions by weight |
| --- | --- |
| Depolymerized rubber | 100 |
| Hard rubber dust, as filler | 20 |
| Coal tar oil, as softener | 10 |
| Sulfur | 30 |
| Zinc oxide | 1 |
| Diphenylguanidine, as accelerator | 1 |
| Carbon black, as pigment and filler | 2 |

Each ingredient may be varied, say within the range of about 50% or more either below or above the proportion stated. Thus, sulfur in a typical formula may be present in amounts of about 20 to 50 parts for 100 parts of the depolymerized rubber. Finely ground crystalline silica may be used as a filler, in the proportion, for example, of 10 to 100 parts for 100 parts of depolymerized rubber. The fillers, softeners, and ingredients other than the rubber and sulfur may be omitted entirely if their effect is not desired.

A rubber anti-oxidant may be included in the compound, in a usual proportion.

The softener may be omitted if its softening effect is not desired. If a softener is used, it may be one that is commonly used in rubber compounds, as, for example, the coal tar oil referred to above, stearin pitch, a liquid asphalt, or cottonseed oil. As shown in the formula above and elsewhere herein, the mixed compound is preferably substantially free of volatile solvent or other volatile dispersion medium.

The invention will be described in greater detail in connection with the drawing, to which reference is made.

Fig. 1 shows in section a development stage in the making of a molded depolymerized rubber container or the lining of a vessel of iron or like material, the view being diagrammatic.

Fig. 2 shows a sectional view that is partly diagrammatic of a later stage in the development.

Fig. 3 shows in section an enlargement of a portion of the wall of a depolymerized rubber container with material against which the compound was molded being still in place.

Figs. 4 and 5 are similar views of modified forms of wall.

Fig. 6 is a sectional view of a container in the form of a pipe having an inner protecting layer of the depolymerized rubber compound.

Fig. 7 is a sectional view of a pipe section having depolymerized rubber lining inside the pipe and over a part of the flanges on the ends of the pipe.

In certain figures the thickness of the cast compound is exaggerated for clearness of illustration.

In the making or lining of a container with our composition, there is provided a mold that may be to advantage in the form of an iron or steel can, drum, tank car, or the like. For the purpose of illustration, there is used a drum of circular cross section including end members 2 and 4 and a side member 6 that is cylindrical in shape. The drum is arranged in upright position with the bottom level and with the upper end 4 removed, turned upside down, and also leveled. Inside the lower end and also inside the inverted cover, there is applied the flowable vulcanizable depolymerized rubber compound. The compound so applied flows as a continuous layer 8 over the ends 2 and 4. The layer so applied is then partially but incompletely hardened by vulcanization, as, for example, by being heated at ordinary atmospheric pressure for about 2 hours or so at a temperature of approximately 120° to 135° C. The vulcanization is discontinued when the rubber compound becomes non-flowable and adapted to retain its position on the ends 2 and 4 when those parts are disposed vertically and rotated slowly.

The cover 4 with applied coating is then placed upon the drum and the drum arranged horizontally in a mechanism for causing its rotation. Thus the drum may be supported upon the driven rollers 10 as shown in Fig. 2. The depolymerized rubber compound is then introduced into the drum, through a bung (not shown), in amount to form the coating 14 inside the cylindrical side member 6 of the drum as the drum is rotated. The drum is then rotated slowly around the horizontal axis, the rate of rotation being so slow as to minimize separation of suspended particles, say at a rate of 0.5 to 2 R. P. M. The coating 14 so applied covers not only the side 6 but also laps against the edges of the layers 8 of the coating material previously applied to the end members.

Heat is applied, as by admitting steam under pressure inside the housing 13 constituting in effect an autoclave enclosing the drum at this stage, so as to cause partial vulcanization of the newly applied layer 14 of the depolymerized rubber compound. The heating and slow rotation is continued until the layer 14, in progressively thickening, approaches non-flowability. This condition may be observed by removing the bung and opening the door of the autoclave at intervals or may be forecast by the time elapsed and the temperature of heating, provided test observations have been made previously on comparable composition to determine the length of time at the temperature of vulcanization required to cause the thickening almost to the point of non-flowability.

When this condition is reached and the danger of objectionable separation of suspended matter has been thus reduced, then the rate of rotation of the drum is increased, so that the thickened compound will form a layer of substantially smooth interior and desired thickness extending completely around and over the side 6 of the mold, the suspended matter being restricted in its separating out even at the higher speed of rotation of the drum by the continually increasing viscosity of the depolymerized rubber compound.

Thus, the speed of rotation may be increased to about 70 to 150 R. P. M. after the thickening has begun. Such regulation of the rotation, coupled with the fine grinding of the sulfur, prevents concentration of the sulfur in the outer part of the cast layer and thus prevents gassing during the vulcanization.

Finally, the separately formed and separately partially hardened layers 8 and 14 of the depolymerized rubber compound are converted to finally hardened form at the same time as by heating the drum for a long time at vulcanization temperature, as, for instance, for about 15 hours or so at a temperature of approximately 130 to 140° C., the exact time as well as the range of temperature being adjusted for the particular compound being treated, so that the final product is a hard, strong material that is integral throughout, with no weak joint zones. During this final vulcanization, the rotation may be discontinued.

During the heating, pressure due to the expanding air is released through a small opening (not shown) that later may be plugged in any convenient manner; the plug used being covered on its inner surface and, if desired, on its outer surface by our compound in vulcanized condition.

If it is desired that the finished article be a coated metal drum or the like, then the article made as described is ready for use after the provision of a suitable charging hole in any convenient manner. Thus the drum may be tapped and threaded for a hard rubber pipe or plug.

When, however, the molded material is thick and, therefore, strong the cover 4 is removed from the drum and the molded liner 14 is rolled or shaken from the mold.

Molds that are to be removed are suitably constructed in halves, with flanges and fasteners (not shown) holding the two halves together and permitting ready separation of the mold from the cast and hardened rubber compound, all in accordance with conventional mold practice. Also, the inside of the mold is preferably coated initially with a solution of a cellulose ether in a volatile solvent, the solvent being allowed to evaporate to form a film of cellulose ether inside the mold before the rubber compound is added, with graphite in water, or with Aresklene (an alkylated and sulfonated aromatic compound). Coatings so applied promote subsequent parting of the cast and hardened material from the mold.

Various thicknesses of layer of our rubber compound may be formed as described, say, about one-eighth to one inch. Usually about three-eighths inch is desirable.

In the composition described there may be incorporated relatively coarse particles of filler material of specific gravity greater than that of the depolymerized rubber as, for example, fine sand, ground quartz, short lengths of wire, or the like. Furthermore, the speed of rotation during the centrifugal casting of the compound against the side 6 may be made substantial during the period before the composition thickens. In this way, the particles of filler material 16 moving under the influence of centrifugal force become more concentrated in the exterior portions of the wall of the cast material than in the inner portion, as shown in Fig. 3, so that there is obtained the strengthening or hardening effect of the fillers with a minimum of contact between them and material with which the container may subsequently be filled.

In another embodiment, a fabric such as cloth, burlap, or a wire gauze is laid over the inside surfaces of the several parts of the mold before the composition for casting is introduced. Thus, the woven member may be placed over the ends 2 and 4 and side 6 of the drum-shaped mold and adhered in position by a limited amount of the depolymerized rubber compound, before the casting is undertaken. When the casting is made and the compound hardened as described, there is produced a structure such as shown in Fig. 4; the fabric 18 is embedded in the wall of the cast composition and, at the same time, is fully protected from contact with materials that may later be charged into the finished container.

In Fig. 5 there is shown a portion of a container including an interliner 17 of relatively soft compound between the walls, such as parts 2 and 6 of the said mold and the inner layer 19 of hard rubber compound. In making such a product, the casting operations and partial curing is repeated, with first a soft compound and then the composition adapted to become hard on vulcanization. The doubly coated article is then subjected to final curing, so that all parts of the coating are converted to fully vulcanized condition at the same time. In this way integral union is obtained and the soft liner decreases the danger of separation of the hard coating from the walls of the mold on sudden changes of temperature or violent mechanical shock, even when the hard layer has been converted to a very hard ebonite-like material.

The soft compound may be of the same composition as the hard compound, except for a reduction of the sulfur content in the soft compound to about 5 to 20 parts for 100 parts of the depolymerized rubber.

When the form or mold in which the casting is made is tubular, say a pipe with strong walls, special advantages are obtained. Thus, an asbestos and cement pipe 20 in cured condition may be partly or completely filled with our flowable hardenable depolymerized rubber compound. If the pipe is only partly filled, the pipe is rotated in a horizontal position, so that the compound is distributed over all of the interior surface. In any case, any excess material present is drained away, as by raising one end of the pipe so as to incline the pipe and discharge the excess compound.

A pipe so coated on the inside is then heated to an elevated temperature to cause vulcanization of the compound in the form of the layer 22 (Fig. 5), while being rotated in case the coating layer is thick. Suitably, the pipe is closed during this heat treatment so that the pressure of air developed in the heated pipe supplements the impregnating effect of the centrifugal force and causes impregnation of the surface portions of the pipe under pressure. As a result, there is thorough footing and adherence of the compound to the pipe. Also, additional pressure may be created by the introduction of air, or gas such as carbon dioxide, nitrogen, or the like, under pressure, say at 25 to 150 pounds or so, to force the compound strongly against the inside wall of the mold (in this case the pipe) as the compound is being hardened.

A pipe so made is resistant to acids and many other chemicals that have a corroding effect upon asbestos and cement compositions. Likewise, the coating compound prevents solution by water of any extractable material present in the freshly made pipe 20.

In place of the asebestos and cement pipe there may be coated in like manner other penetrable tubes, as, for example, one composed largely of Portland cement.

In the lining of pipes with flanged ends, the same steps are resorted to as in the case of the asbestos and cement pipe. Suitably, however, the flanges selected are provided with a recessed portion. In the application of the coating, the pipe is supported horizontally on a revolving mechanism and sufficient compound is added to fill the said recess with the compound 24 and provide the layer 26 of desired thickness of material inside the wall of the pipe, the pipe being subjected to rotation during the hardening of the layer 26, so as to cause centrifugal casting of the layer. The treated pipe is then heated to cause final hardening of the compound.

In the initial and final hardening of the compound applied inside the pipe, about the same temperatures and time periods are used as in hardening the containers or linings inside drums, tank cars, or the like, all as stated above.

When our composition is used to coat a rectangular object, or object of other shape, one side or part may be coated at a time and the coating partially hardened to non-flowable composition. When all sides or parts that are to be protected have been so treated, then the coating on all sides is subjected to final hardening.

Glass may be used as the material against which the depolymerized rubber is cast. In case strong adherence to the glass is a feature, then the glass is first treated with a solution of a caustic alkali to remove the surface glaze and improve the adherence of the cast composition to the glass. In any case, the depolymerized rubber compound is hardened by vulcanization subsequent to the application to the glass.

For some purposes it is desirable to use glass as a surface against which the depolymerized rubber compound is shaped and then to separate the compound after hardening from the glass. To make this separation feasible, the glass is first coated with a material which lubricates or promotes subsequent parting of the compound from the glass. Among such lubricating or parting agents there may be used alkylated and sulfonated aromatic compounds (Aresklene), ethyl cellulose, or graphite applied as a suspension in water, the water being allowed to evaporate before the depolymerized rubber compound is applied.

While the casting of the depolymerized rubber compound has been illustrated by description in connection with the formation of a layer of the compound inside a drum, pipe or the like, the compound may be applied over the outside of these or other suitable forms or over irregular surfaces that do not lend themselves to satisfactory coating by a centrifugal casting process. In making the application over the outside of the molds or over irregular surfaces, the compound is prepared in a plastic substantially non-flowable condition adapted to be applied by trowelling on and is de-aired as described. The composition so made is then applied with a trowel, knife, or other equipment upon the surface to be coated and is pressed firmly against the surface and also against itself, so that a continuous non-porous coating is applied.

In making the trowelling compound, there is used to advantage an increased proportion of solid inert filler material over that used in making the compound for casting. A typical trowelling compound, for instance, is of the following composition:

| | Parts |
|---|---|
| Depolymerized rubber | 100 |
| Sulfur | 20–40 |
| Carbon black | 30–70 |
| Accelerator (Captax) | 1 |
| Activator of the accelerator (zinc stearate) | 1 |
| Activator of the accelerator (zinc oxide) | 2 |
| Antioxidant (Neozone D) | 1 |

This compound is adapted for use wherever trowelling is preferred over other methods of shaping the compound.

The compound once applied is hardened by vulcanization, the compound being shape-retaining even before the vulcanization, so that the object may be hardened with the layer of applied compound in any position, that is, vertical, horizontal, or inclined.

In addition to the illustrative articles that have been described, we may make other shaped, hard masses such as baseball bats, golf club heads, and bowling pins. In making such articles a suitably designed mold is provided. The mold may be made in halves or a plurality of parts which may be separated after the compound is cast and hardened. Or there may be used a mold of plaster or other material that may be removed after the compound is hardened. When the mold is made in a plurality of parts, then the mold may be made of steel, cast iron, or other such material. The depolymerized rubber compound including finely ground sulfur and being in desired condition is flowed into and shaped in the molds in any convenient manner for static molding and the compound is then vulcanized.

The compounds made as described are very strong, uniform, dense, and non-porous. When cast even under the influence of gravity only and then vulcanized, they reproduce well fine detail of the mold.

While our compounds are particularly adapted for shaping without the use of volatile solvent, the compounds may be thinned with a solvent for application to a surface by spraying, dipping, or other means requiring very low viscosity. Inexpensive solvents are volatile petroleum or coal tar distillates, as, for example, V. M. & P. naphtha, cleaner's naphtha, toluene, or xylene. The proportion of solvent used is selected to give the desired fluidity and, if used at all, will be ordinarily in the proportion of about 1 to 50 parts for 100 parts of the depolymerized rubber.

Our compound is especially adapted to adhere firmly together articles such as unglazed porcelain, glass, or other brittle materials. When two layers of such material are adhered by our compound and the compound then hardened by vulcanization, there is an extremely strong bonding of the pieces together and the impact resistance is greatly increased. To increase the impact resistance only, it is sufficient to apply our compound to one surface only of one piece of glass, porcelain, or the like and then harden the compound.

Layers formed and hardened as described herein may be given a smooth, glossy surface by the application of a finish coat of our compound in the form of a liquid of low viscosity. Such a compound is made by the use of a low percentage of sulfur and relatively severe conditions of depolymerization of the original rubber, as for example, depolymerization at about 310° C. for 2 to 4 hours. The low viscosity depolymerized rubber is then compounded as follows, for instance:

| | Parts |
|---|---|
| Depolymerized rubber | 100 |
| Sulfur | 0 to 4 |
| Accelerator (Tuads) | 2 |

The composition is roller-mill-ground, de-aired as described, warmed, and then brushed onto the previously formed gelled but incompletely vulcanized layer of depolymerized rubber, to give the desired smooth glaze. The whole is then vulcanized at one time, sulfur migrating from the said gelled layer into the coating as shown by the fact that all sulfur may be omitted from the finish coat without preventing its vulcanization.

Our compositions may be used also for injection molding.

Charging holes or air vents at suitable locations (not shown) may be present in any of the molds used. Such openings may be caused to communicate freely with the air, may be closed during the heating operation when it is desired to harden under pressure, or may be used in the introduction of air or an inert gas during vulcanization.

The terms "harden" and "hardenable" are used herein to mean "cured" and "firmed up" or carried to the final state of vulcanization suitable for the use to which the compound is intended.

We have described illustrative practices of the invention. It is to be understood that specific conditions of operation may be varied without departing from the spirit of the invention.

What we claim is:

1. The method of making an article which comprises providing a mold of suitable shape having a plurality of molding surfaces that are contiguous and that lie in different planes, applying a continuous layer of a vulcanizable depolymerized rubber compound that is substantially free from volatile solvent in separate applications over the several surfaces so that the various applications contact each other at their edge portions, incompletely vulcanizing to non-flowable consistency the compound applied to each of the said surfaces before the next application is made, then completing at the same time the vulcanizing of the compound applied over all of the said surface, so that the several applications of the compound become integral.

2. The method of making an article which comprises providing a generally cylindrical mold, applying a continuous layer of a vulcanizable depolymerized rubber compound that is substantially free from volatile solvent and of flowable consistency over the inside of each end of the mold, maintaining each end in level position as a support for the layer of applied compound and partially but incompletely vulcanizing the applied compound to non-flowable consistency, applying the compound over the inside of the generally cylindrical side member of the mold, maintaining the compound as a layer of desired thickness over the side member, vulcanizing the said layer and completing the vulcanization at the same time of the compound on the said ends and side member, so that the compound becomes integral over all the inside surfaces of the mold.

3. The method of coating an object of generally circular cross section which comprises maintaining, inside the curved surface and by rotation of the object, a flowable layer of vulcanizable compound including suspended particles of specific gravity substantially different from that of the fluid part of the compound, vulcanizing the compound, keeping the speed of rotation slow during the initial stages of vulcanization of the compound until the compound begins to gel substantially, then increasing the speed of rotation as the vulcanization proceeds, so that separation of suspended particles is minimized during the initial stages of the vulcanization and spreading of the compound over the curved surface is promoted as the compound thickens.

4. The method described in claim 1 including distributing the compound over at least one of the mold surfaces centrifugally by rotating the mold while maintaining a supply of the coating compound inside the rotated mold, the said compound containing as vulcanization agent sulfur in the condition of having been finely ground into the compound so that it does not separate from the compound under the influence of the centrifugal force.

5. The method described in claim 2, the depolymerized rubber compound being distributed over the side member or members by centrifugal force and the compound containing finely divided sulfur as vulcanization agent and suspended particles of relatively coarse filler materials, the sulfur being not subject to separation from the compound under the influence of the centrifugal force and the said particles separating under the centrifugal force and becoming more concentrated in the outer portions of the cast composition than in the inner portions thereof.

6. The method described in claim 1, the depolymerized rubber compound being substantially free from volatile solvent and air bubbles.

7. The method described in claim 3, the said vulcanizable compound being a depolymerized rubber composition that is substantially free from a volatile solvent.

HERBERT V. HARDMAN.
KENNETH V. HARDMAN.